(12) United States Patent
Elliott

(10) Patent No.: US 7,522,628 B1
(45) Date of Patent: Apr. 21, 2009

(54) SYSTEMS AND METHODS FOR IMPLEMENTING COORDINATED OPTICAL CHANNEL ACCESS

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1232 days.

(21) Appl. No.: 10/715,738

(22) Filed: Nov. 17, 2003

(51) Int. Cl.
*H04J 3/16* (2006.01)

(52) U.S. Cl. .................. 370/437; 370/328; 370/348

(58) Field of Classification Search ............... 370/328, 370/329, 338, 345, 347, 348, 437, 438, 439, 370/442, 443, 444, 458, 461, 462
See application file for complete search history.

(56) References Cited

U.S. PATENT DOCUMENTS

| | | | |
|---|---|---|---|
| 5,390,040 A | 2/1995 | Mayeux | |
| 5,787,077 A | 7/1998 | Kuehnel et al. | |
| 6,049,533 A * | 4/2000 | Norman et al. | 370/328 |
| 6,323,980 B1 | 11/2001 | Bloom | |
| 6,347,001 B1 | 2/2002 | Arnold et al. | |
| 6,788,898 B1 | 9/2004 | Britz et al. | |
| 6,931,232 B1 | 8/2005 | Wolcott | |
| 7,042,897 B1 * | 5/2006 | Sivaprakasam et al. | 370/462 |
| 7,187,867 B2 * | 3/2007 | Kawabe et al. | 398/126 |
| 7,190,672 B1 | 3/2007 | Whitehill | |
| 7,453,840 B1 * | 11/2008 | Dietrich et al. | 370/328 |
| 2002/0080755 A1 | 6/2002 | Tasman et al. | |
| 2003/0078074 A1 * | 4/2003 | Sesay et al. | 455/561 |
| 2003/0190168 A1 | 10/2003 | Song et al. | |
| 2004/0017785 A1 * | 1/2004 | Zelst | 370/328 |
| 2004/0076164 A1 | 4/2004 | Vanderveen et al. | |
| 2004/0120717 A1 * | 6/2004 | Clark et al. | 398/118 |
| 2004/0233877 A1 * | 11/2004 | Lee et al. | 370/338 |
| 2004/0258417 A1 * | 12/2004 | Volpi et al. | 398/135 |
| 2005/0135295 A1 * | 6/2005 | Walton et al. | 370/328 |
| 2005/0152305 A1 * | 7/2005 | Ji et al. | 370/328 |
| 2005/0232639 A1 * | 10/2005 | Zimmerman | 398/140 |
| 2007/0109993 A1 * | 5/2007 | Beach | 370/328 |
| 2008/0075033 A1 * | 3/2008 | Shattil | 370/328 |
| 2008/0081622 A1 * | 4/2008 | Gunaratnam et al. | 455/435.2 |
| 2008/0101283 A1 * | 5/2008 | Calhoun et al. | 370/328 |

OTHER PUBLICATIONS

Final Office Action dated Nov. 15, 2007, U.S. Appl. No. 10/715,751.
U.S. Patent Application entitled "Systems and Methods for Implementing Contention-Based Optical Channel Access"; filed herewith; Brig Barnum Elliott; 37 pages.
U.S. Patent Application entitled "Optical AD-HOC Networks"; filed herewith; Brig Barnum Elliott; 47 pages.
U.S. Appl. No. 10/715,751, Elliott, Brig.
U.S. Appl. No. 10/716,270, Elliott, Brig.

* cited by examiner

*Primary Examiner*—Chi H. Pham
*Assistant Examiner*—Kevin Mew
(74) *Attorney, Agent, or Firm*—Ropes & Gray LLP

(57) ABSTRACT

A system for optical channel access in a network (105) includes multiple distributed nodes (205) that further include a first node (420), a second node (410) and a third node (415). The first node (420) of the multiple distributed nodes requests optical channel access with at least one other node via radio-frequency (RF) messaging. A second node (410) of the multiple distributed nodes grants or denies the requested optical channel access. The third node (415) establishes optical channel access to the first node (420) based on whether the second node (410) grants or denies the requested optical channel access.

37 Claims, 12 Drawing Sheets

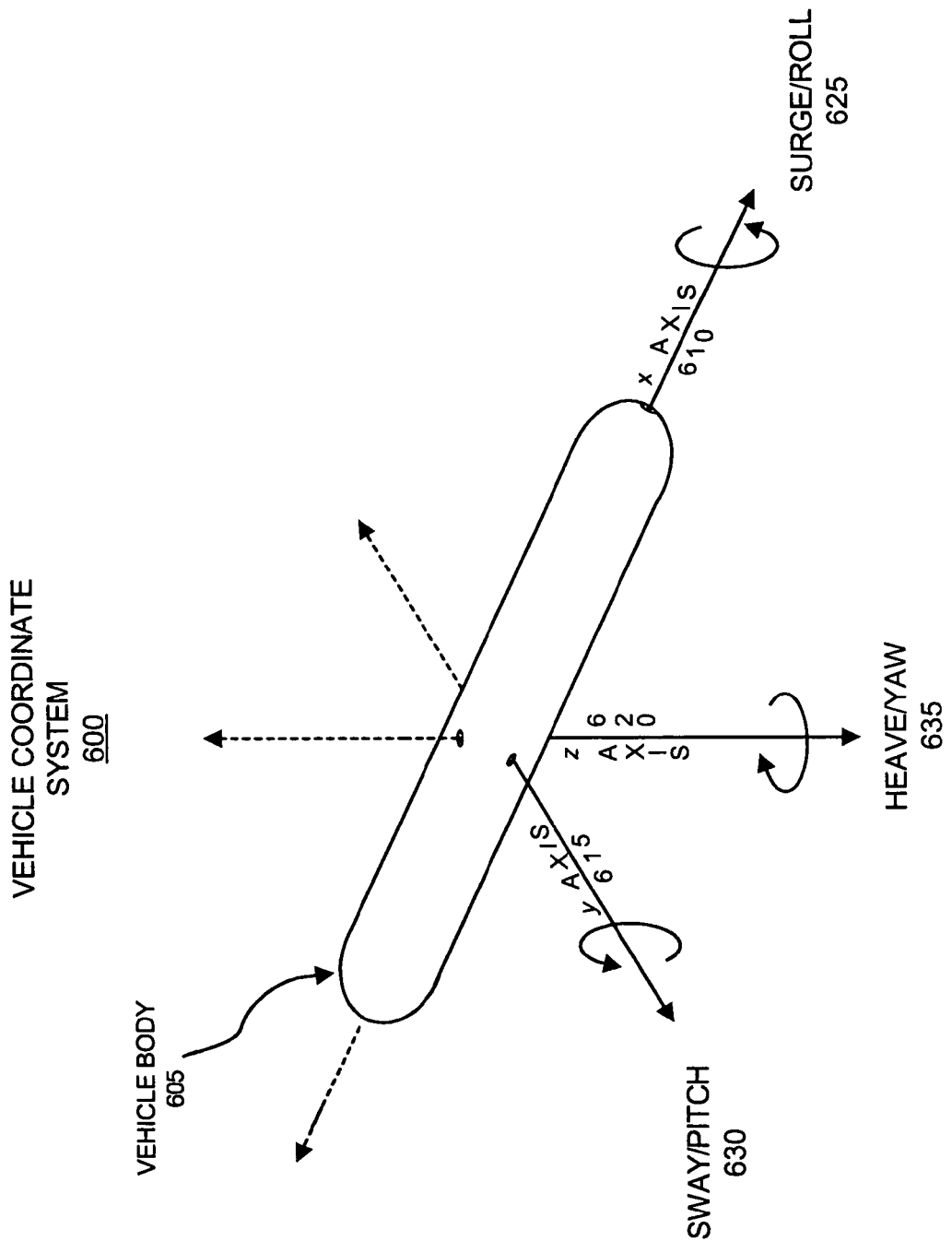

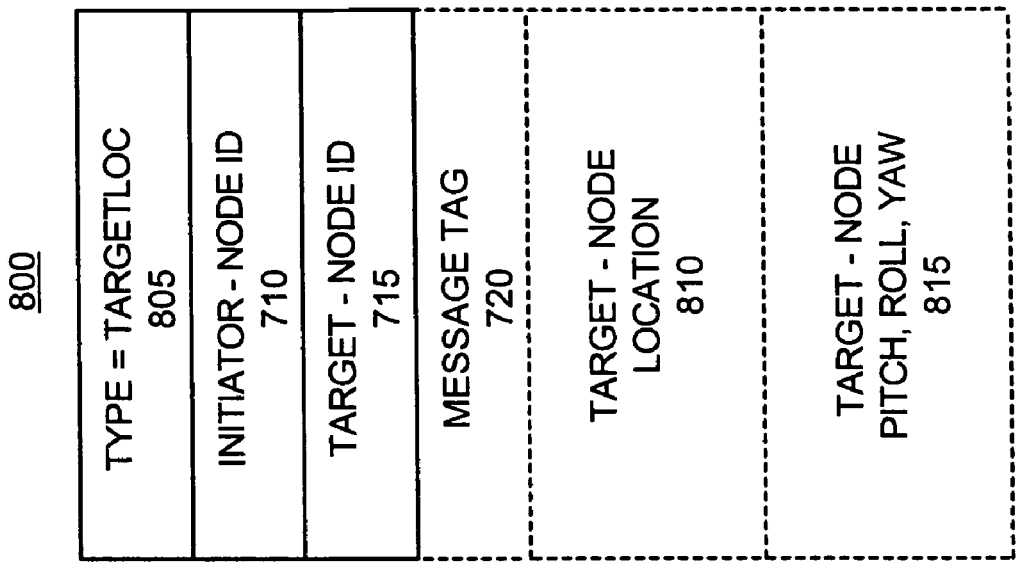

SYSTEMS AND METHODS FOR IMPLEMENTING COORDINATED OPTICAL CHANNEL ACCESS

RELATED APPLICATIONS

The present application is related to commonly assigned U.S. patent application Ser. No. 10/716,270, entitled "Optical Ad-Hoc Networks," and filed on a same date herewith; and commonly assigned U.S. patent application Ser. No. 10/715,751, entitled "Systems and Methods for Implementing Contention-Based Optical Channel Access," and filed on a same date herewith, the disclosures of which are hereby incorporated herein by reference in their respective entireties.

FIELD OF THE INVENTION

The present invention relates generally to ad-hoc networks and, more particularly, to systems and methods for implementing coordinated optical channel access in ad-hoc networks.

BACKGROUND OF THE INVENTION

Wireless data communication is often required in an environment where communications infrastructure, such as base stations or a wired backbone network, does not exist, or is not economical or is impractical to use. For example, in military or emergency environments, adequate infrastructure often does not exist in necessary locations and constructing such an infrastructure would be either impractical or not economical for the short-term use that is often required. Mobile multi-hop radio frequency (RF) wireless networks have, therefore, been developed to provide wireless data communications in such environments.

In a conventional mobile RF wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop RF wireless network to perform effectively, all nodes must, therefore, be prepared to route packets on behalf of other nodes.

One drawback back with conventional multi-hop RF wireless networks is that the RF channel that is used to transmit data, such as packet data, can be relatively slow (e.g., kilobits or megabits per second of data throughput). Therefore, it would be desirable to employ other transmission mediums for transmitting data that can transmit data at much higher throughputs, such as, for example, multiple gigabits per second of data throughput.

SUMMARY OF THE INVENTION

Systems and methods consistent with the present invention implement mechanisms for employing ad-hoc optical links and channels for transmitting data in an ad-hoc network. Optical links, consistent with the invention, permit very high throughputs, such as multiple gigabits per second, in an ad-hoc environment, where nodes may be moving around and links may be created and terminated with a high degree of frequency. The ad-hoc optical links of the present invention may be created automatically between two nodes in response to the traffic that the two nodes must convey. In an ad-hoc network consistent with the invention, any given node may attempt to establish an optical link to any other node in range whenever it wishes.

Systems and methods consistent with the present invention may use a hybrid, coordinated RF/optical channel access scheme, where nodes send RF messages to a master node that coordinates, and supervises, the establishment of optical links between optical nodes in the ad-hoc network. When the master node grants permission to establish the optical links in response to the RF messaging, the ad-hoc optical nodes may establish the optical links for high-speed communication via optical channels. In some exemplary embodiments, establishment of the optical links may include steering of one or more optical apertures, such as, for example, an optical telescope, to point towards the node to which an optical link is going to be established. Steering of the optical aperture may, thus, permit optical link establishment with mobile optical nodes that may frequently change position.

In accordance with the purpose of the invention as embodied and broadly described herein, a method of implementing optical channel access in a network that includes multiple distributed nodes and a master node is provided. The method includes requesting the optical channel access via radio-frequency (RF) messaging from one or more of the multiple distributed nodes to the master node. The method further includes granting, from the master node, the optical channel access to at least one of the multiple distributed nodes based on the RF messaging.

In another implementation consistent with the present invention, a method of establishing an optical link between a first node and a second node in a network, wherein at least one of the first and second nodes includes a mobile node, is provided. The method includes sending a request message to establish the optical link from the first node to a third node via electrical signals over an electrically transmissive medium and receiving a request denied message or a request granted message from the third node via electrical signals over the electrically transmissive medium. The method further includes establishing an optical link between the first node and the second node based on the receipt of the request granted message and transmitting data between the first node and the second node via optical signals over the optical link.

In a further implementation consistent with the present invention, a method of coordinating communication between first and second nodes in a network via a master node is provided. The method includes arbitrating, at the master node, establishment of an optical channel between the first and second nodes by transmitting electrical signals over a non-optical channel to the master node from at least one of the first and second nodes. The method further includes granting, at the master node, the establishment of the optical channel between the first and second nodes based on the transmitted electrical signals over the non-optical channel and communicating via the established optical channel between the first and second nodes.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIG. 6 illustrates an exemplary vehicle coordinate system, that may be associated with individual optical nodes of FIG. 2, consistent with the present invention;

FIG. 7 illustrates an exemplary "request link" message, consistent with the present invention, for requesting, via a master node, the establishment of an optical link between optical nodes;

FIG. 8 illustrates an exemplary "target location" message, consistent with the present invention, for sending a location of a target optical node to another optical node that is attempting to initiate optical communication with the target optical node;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention implement a hybrid RF/optical channel access scheme, that may be employed in a multi-hop, ad-hoc network, in which a master node coordinates and supervises the establishment of optical links between the various optical nodes of the network. The use of optical links for transmission of significant quantities of data, as opposed to conventional RF links, permits very high throughputs, on the order of multiple gigabits per second, in an ad-hoc environment where nodes may be moving around and links may be created and terminated with a high degree of frequency.

Exemplary Network

Figure 1:
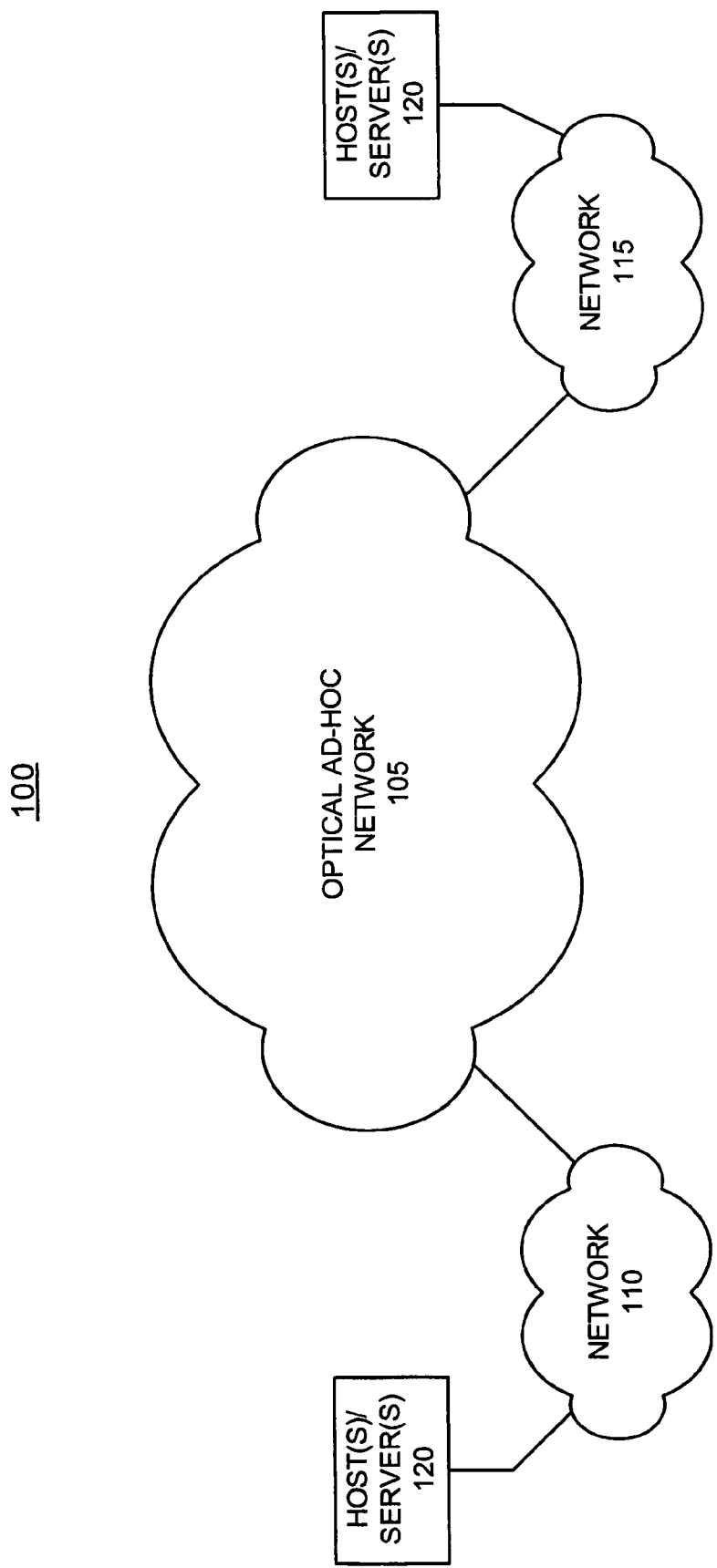
FIG. 1 illustrates an exemplary network in which systems and methods, consistent with the present invention, may be implemented.

FIG. 1 illustrates an exemplary network 100 in which systems and methods may implement coordinated optical channel access consistent with the present invention. Network 100 may include an optical ad-hoc sub-network 105, sub-networks 110 and 115 and host(s)/server(s) 120. Optical ad-hoc sub-network 105 may include a multi-hop, ad-hoc, optical packet-switched network. In other implementations consistent with the invention, sub-network 105 may include other types of networks, such as, for example, a circuit-switched network. Optical ad-hoc sub-network 105 may interconnect with sub-networks 110 and 115 via wired, wireless or optical links.

Sub-networks 110 and 115 may include one or more networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks. One or more hosts and/or servers 120 may interconnect with sub-networks 110 and 115.

Figure 2:
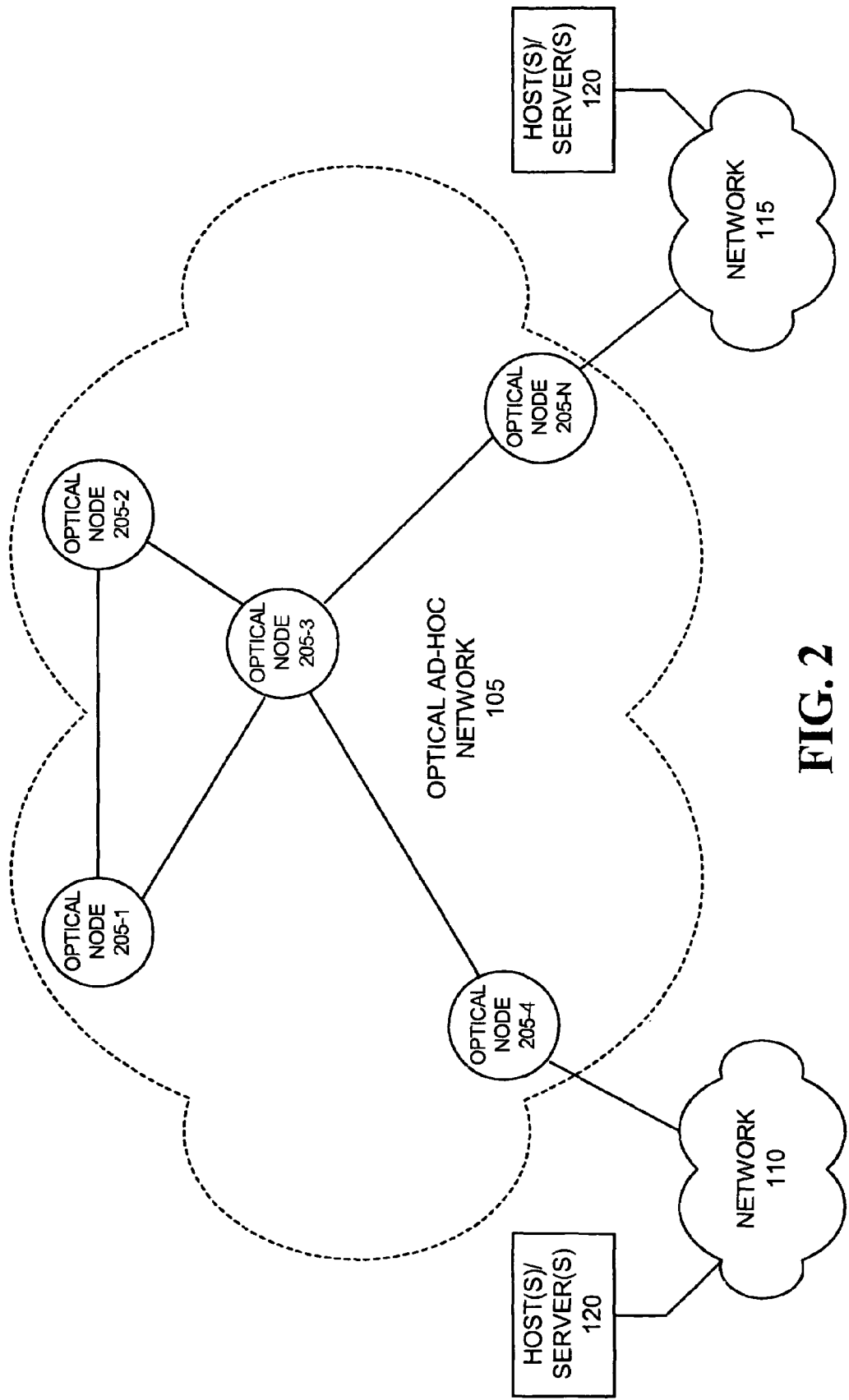
FIG. 2 illustrates optical nodes of the exemplary optical ad-hoc network of FIG. 1 consistent with the present invention.

As shown in FIG. 2, optical ad-hoc sub-network 105 may include multiple optical nodes 205-1 through 205-N (collectively referred to as optical nodes 205) that each may have the capability to communicate via, for example, both radio-frequency (RF) and optical links. The optical links may include one or more optical channels that may carry light throughout the electromagnetic spectrum, including light in the human visible spectrum and light beyond the human-visible spectrum, such as, for example, infrared or ultraviolet light. The optical links may include a free-space optical path, such as, for example, a path through the atmosphere or outer space, or even through water (e.g., below the sea) or other transparent media. The RF links may include one or more RF channels that consist of some time, frequency or code division multiplexed portion of an RF spectrum.

In a multi-hop, ad-hoc, optical packet-switched network, each optical node 205 of sub-network 105 may route packets on behalf of other optical nodes and, thus, serve as an intermediate node between a packet source optical node and a destination optical node in sub-network 105. Each optical node 205 may include a mobile entity, such as, for example, an automobile, an airplane, a helicopter, a missile, a ship, a submarine, or a satellite. Each optical node 205 may further include a stationary, or semi-stationary entity, such as, for example, a ground station, a cellular base station or a stationary satellite. Each optical node 205 may communicate with another optical node via an optical link established using, for example, a steerable aperture (not shown). The number of optical nodes 205 shown in FIG. 2 is for illustrative purposes only. Fewer or greater numbers of optical nodes 205 may be employed in optical ad-hoc sub-network 105 consistent with the present invention.

Figure 3:
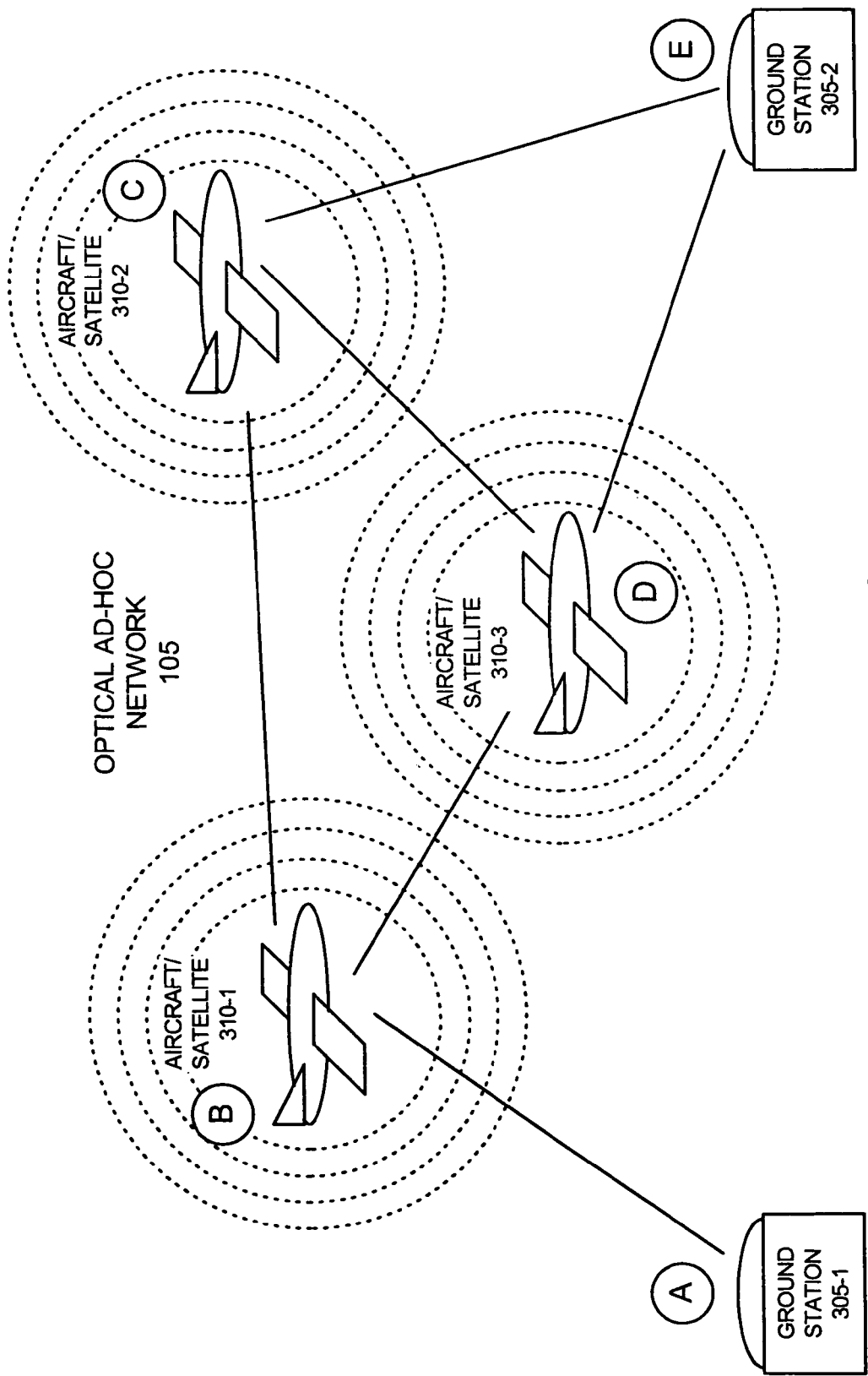
FIG. 3 illustrates one exemplary implementation, consistent with the present invention, in which optical nodes of the optical ad-hoc network include ground stations, aircraft and/or satellites.

FIG. 3 illustrates one exemplary embodiment of the invention in which the optical nodes 205 of optical sub-network 105 may include ground stations 305-1 through 305-2 and aircraft/satellites 310-1 through 310-3. Ground station 305-1 (node A) may establish an optical link with node B 310-1. Node B 310-1 may further establish an optical link with nodes C 310-2 and D 310-3. Node C 310-2 may establish an optical link with ground station 305-2 (node E) and node D 310-3 may also establish an optical link with node E 305-2. In accordance with the exemplary embodiment of FIG. 3, data may be transmitted using ad-hoc optical links between ground stations 305-1 and 305-2 via nodes B 310-1, C 310-2 and D 310-3.

Exemplary RF Communication

Figure 4:
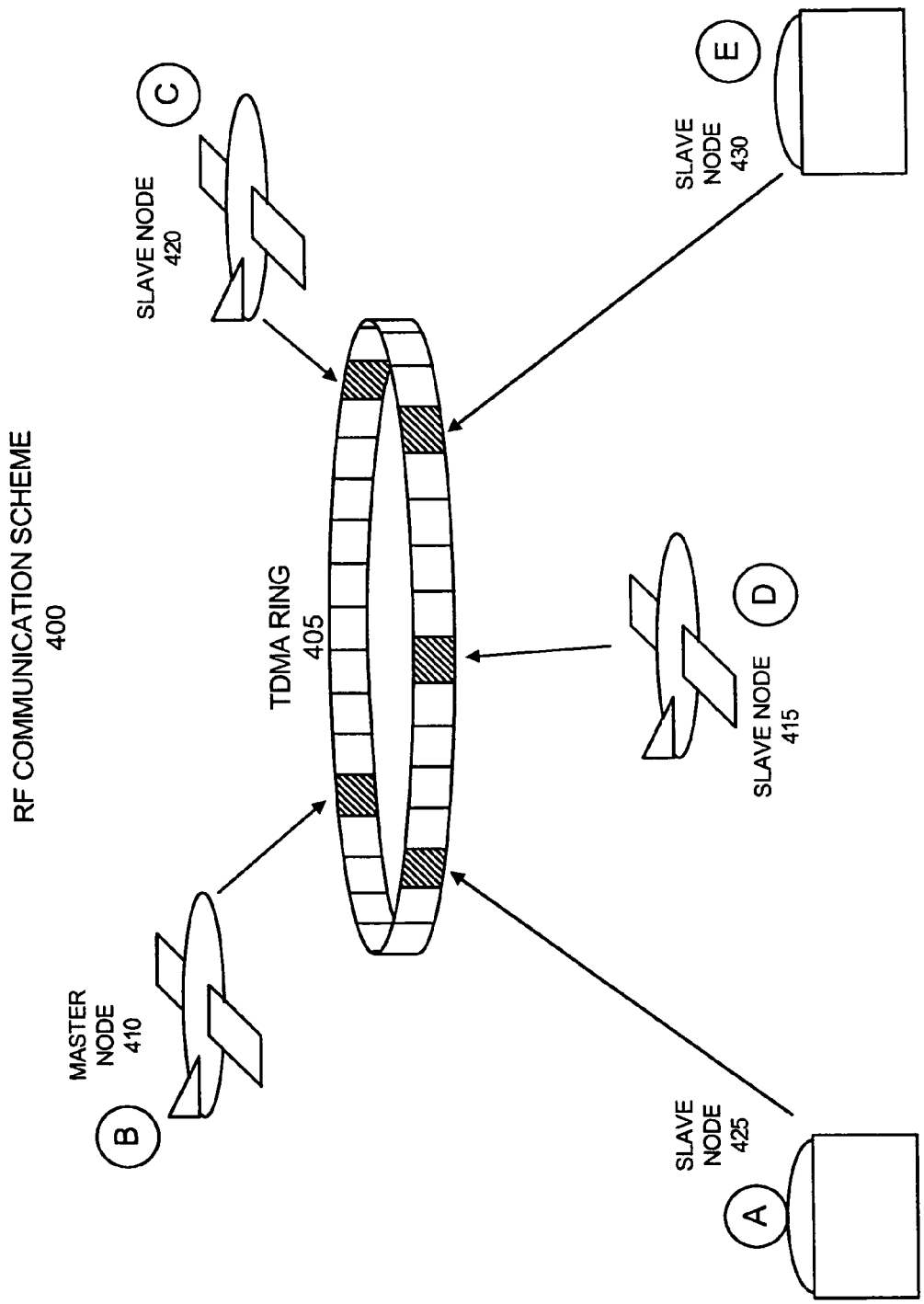
FIG. 4 illustrates an exemplary RF communication scheme consistent with the present invention.

FIG. 4 illustrates an exemplary RF communication scheme 400, consistent with the present invention, for communicating among the optical nodes 205 of ad-hoc sub-network 105. RF communication scheme 400 may include one or more time division multiple access (TDMA) rings 405 (for purposes of illustration, only one TDMA ring 405 is shown in FIG. 4) for use by a master node 410 and slave nodes 415-430 for communicating with one another.

As shown in FIG. 4, each of the nodes 410-430 may be allocated one or more time "slots" in which it may transmit (for purposes of illustration, only one "slot" is shown per node). Master node 410 may coordinate TDMA ring 405's activities.

In general, some or all nodes in ad-hoc sub-network 105 may listen and/or receive during any given transmit slot. Each slot of TDMA ring 405, thus, may provide a "broadcast" medium in which every transmitting node has at least one guaranteed slot in which it may transmit without contention. In some implementations, consistent with the invention, all other nodes may have their receivers turned on during every slot, i.e., all nodes can "hear" whatever a given node transmits.

Using TDMA ring 405, all slave nodes (e.g., nodes 415-430) may send optical channel access requests to a master node (e.g., master node 410) that decides which optical links will be established, and issues instructions accordingly. Although not shown in FIG. 4, master node 410 may send out a command at intervals telling all nodes to submit their requests for the next "epoch." Master node 410, thus, may establish a pattern of "negotiation times" followed by actual link establishment and use, followed by re-negotiation times, and so forth.

FIG. 4 has been described as using a "broadcast" TDMA scheme, in which all nodes transmit on the same frequency and, thus, can "hear" each other. However, frequency division multiplexing (FDM) may be employed in conjunction with TDMA such that all slave nodes can "hear" the master node, and the master node can "hear" all slave nodes, but the slave nodes may not be able to "hear" each other. In one implementation, for example, "slave to master" communications may take place on one frequency, but "master to slave" communications may take place on another. Additionally, "slave to slave" RF communications may take place on yet another frequency. In such an implementation, where FDM is used with the TDMA ring 405 of FIG. 4, an optical node (e.g., node C) attempting to initiate the establishment of an optical link with another optical node (e.g., node D) may include its position in a request link message sent to the master node. The master node may, in turn, send a message to node D informing node D of node C's position, and node C may respond to the master node giving node D's position. The master node may then include the position of both node C and D in its make link message that authorizes the establishment of an optical link between nodes C and D. When nodes C and D receive the make link message, they may each have location information for the other and can then point their optical apertures accordingly (see steerable aperture 550 below).

Exemplary Optical Node

Figure 5:
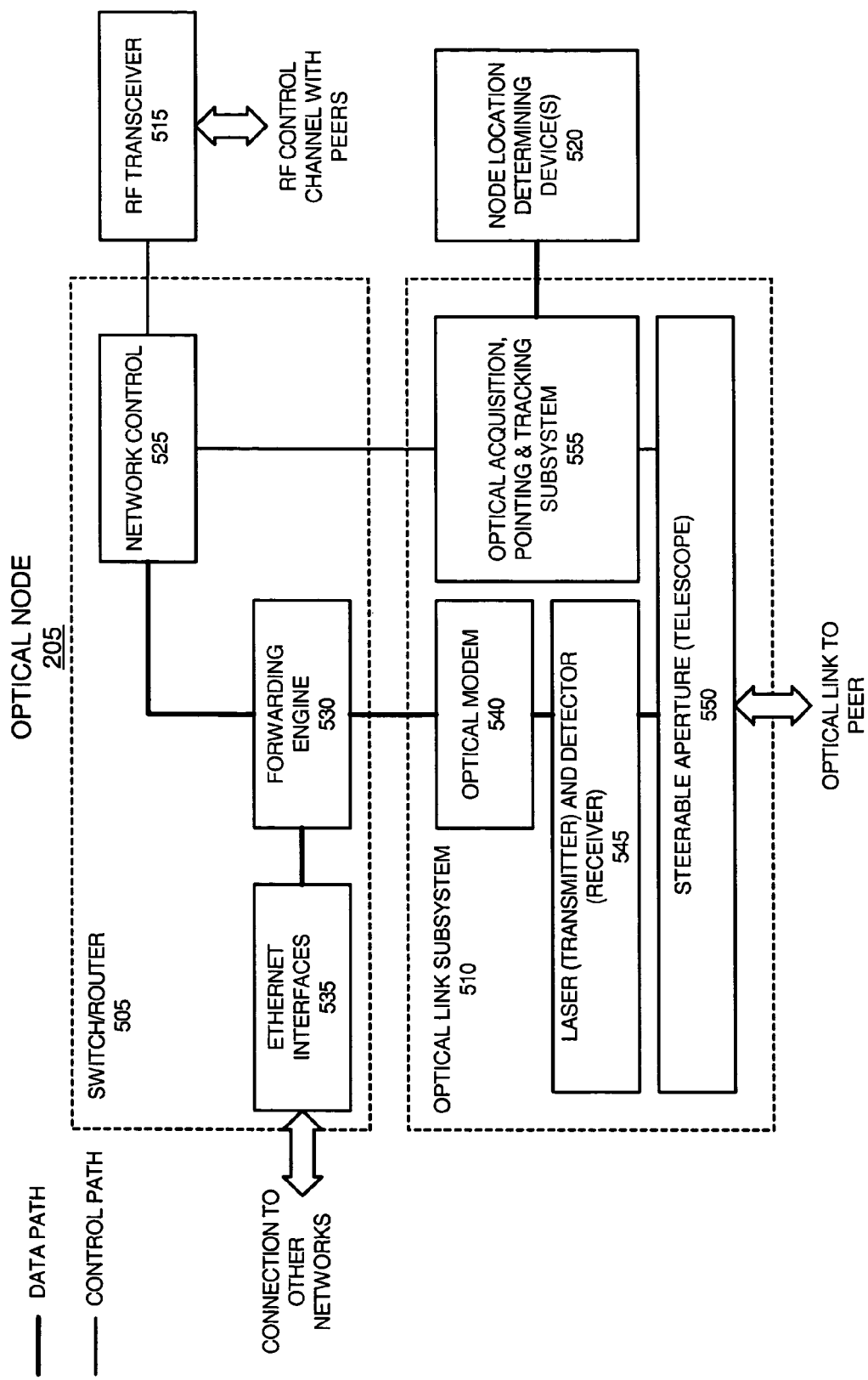
FIG. 5 illustrates exemplary components of an optical node of the optical ad-hoc network of FIG. 2 consistent with the present invention.

FIG. 5 illustrates exemplary components of an optical node 205 consistent with the invention. An optical node 205 may include a switch/router 505, an optical link subsystem 510, a RF transceiver 515 and a node location determining device(s) 520. Though only a single optical link subsystem 510 is shown in FIG. 5, multiple (i.e., at least two) optical link subsystems 510 may be included in each optical node 205.

Switch/router 505 may include a network controller 525, a forwarding engine 530 and Ethernet interfaces 535. Network controller 525 may execute the ad-hoc routing protocols and manage the ad-hoc network topology. Forwarding engine 530 may forward data through the ad-hoc sub-network 105 in accordance with routing data accumulated by network controller 525. Network controller 525 and forwarding engine 530 may be linked by any form of communication mechanism, such as, for example, an Ethernet or a PCI bus backplane. Ethernet interfaces 535 may interconnect optical node 205 with other networks, such as, for example, sub-networks 110 and 115.

Optical link subsystem 510 may include an optical modem 540, a laser (transmitter) and detector (receiver) 545, a steerable aperture 550, and an optical acquisition, pointing and tracking subsystem 555. Optical link subsystem 510 may "plug in" to forwarding engine 530 by a standard interface such as, for example, an Ethernet interface. Optical modem 540 may include conventional mechanisms for controlling the transmission and reception of data via optical pulses, such as, for example, mechanisms for modulating/demodulating an optical beam, and for implementing error correction, interleaving, etc., as required for reliable communication. Laser and detector 545 may include conventional lasers for transmitting optical pulses and conventional detectors for detecting optical pulses received from another optical node 205 as directed by optical modem 540. Steerable aperture 550 may include, for example, a telescope, for establishing an optical link in a specified direction from optical node 205. Optical acquisition, pointing and tracking subsystem 555 may keep track of the location, velocity and/or acceleration of neighboring optical nodes such that it can provide instructions to steer steerable aperture 550 to establish optical links with the neighboring nodes.

RF transceiver 515 may include conventional circuitry for communicating via radio frequencies. In one implementation consistent with the invention, RF transceiver 515 may include a RF transmit/receive suite, its associated electronics, and a directional and/or omni-directional antenna (not shown). RF transceiver 515 may operate, in some implementations, in accordance with IEEE standard 802.11 or in accordance with TDM radio architectures such as that of the Joint Tactical Information Dissemination System, the Joint Tactical Radio System, or satellite-oriented radio architectures such as DAMA. RF transceiver 515 may include any type of RF radio device that runs in any RF spectrum. For example, RF transceiver 515 may run in the VHF, UHF, L, either of the ISM bands, a satellite band, or any other RF band.

Node location determining device(s) 520 may include one or more devices that provide node geographic location data. Device(s) 520 may include one or more of a Global Positioning System (GPS) device, an inertial management unit, or a vehicle navigation unit that provide a location of optical node 205. Location determining device(s) 520 may determine a current latitude, longitude and altitude of optical node 205. Location determining device(s) 520 may further determine a three-dimensional velocity vector and, possibly, a three-dimensional acceleration vector, associated with optical node's 205 current motion relative to a fixed point, such as, for example, the earth.

In other implementations consistent with the invention, if device(s) 520 includes a GPS device, then device 520 may supply geographic positions in global coordinates, such as standard world models like the World Geodetic System (WGS 84) or the Military Grid Reference System (MGRS). The World Geodetic System designates coordinates in latitude and longitude in degrees, and height over the geoid (mean sea level) in meters. The MGRS is based on the Universal Transverse Mercator (UTM) projection from 84 degrees north to 80 degrees south. In MGRS, the earth's surface is sliced into sixty North-South "orange slices," with each slice being six degrees wide and projected onto a flat plane with coordinates Easting (distance in meters from the local meridian, which is centered every 6 degrees), Northing (distance in meters from the equator), and altitude (meters above sea level). MGRS has the advantage of providing genuine "local flat earth" three-vectors aligned with East (E), North (N) and up (U), suitable for local ballistics, intervisibility and other computations.

Location determining device(s) 520 may further keep track of optical node's 205 current pitch, roll and yaw. Pitch, roll and yaw may be determined from conventional sensor technology.

Exemplary Vehicle Coordinate System

FIG. 6 illustrates an exemplary vehicle coordinate system 600, that may be associated with one or more optical nodes 205 of optical ad-hoc sub-network 105, consistent with the invention. As shown, a vehicle body 605 for each optical node 205 has a local coordinate system in which the positive x axis 610 may be in the vehicle forward direction, the positive y axis 615 may be to the right of the vehicle forward direction, and the positive z axis 620 may be down. As with conventional aerospace standards, a number of motions may be associated with each axis. For example, surge/roll motions 625 may be associated with x axis 610, sway/pitch motions may be associated with y axis 615 and heave/yaw motions 635 may be associated with z axis 620. As shown in FIG. 6, the vehicle coordinate system includes a right-handed coordinate system, where rotations about the axes are also right handed. "Strap-down" sensors, such as, for example, an acceleration sensor and a magnetic field sensor may measure components of external vectors (e.g., gravity, magnetic field) relative to the local vehicle coordinate system x 610, y 615 and z 620 axes.

Exemplary Request Link Message

FIG. 7 illustrates an exemplary request link message 700 that may be sent from an initiator optical node to a master optical node for the purpose of requesting the establishment of an optical link between the initiator node and a target node. Request link message 700 may include a message type field 705, an initiator node identifier (ID) field 710, a target node ID field 715, an optional message tag field 720, an optional initiator node location field 725 and an optional initiator node pitch, roll and yaw field 730.

Message type field 705 may designate message 700 as a request link message. Initiator node ID field 710 may include a unique identifier associated with the optical node that is initiating the optical link establishment request (e.g., the initiator node). Target node ID field 715 may include a unique identifier associated with the optical node with which the initiator node wishes to establish an optical link. Message tag field 720 may include any type of identifier for identifying a particular interaction, such as, for example, a sequence number, a unique identifier, a challenge/response field, etc. Initiator node location field 725 may include data identifying a geographic location of the initiator optical node. Such geographic location data may include, for example, a latitude, longitude and altitude associated with the location of the initiator node. Node location field 725 may be derived from data from node location determine device(s) 520. In some exemplary embodiments, node location data field 725 may additionally include a three-dimensional velocity vector and, possibly, a three-dimensional acceleration vector that indicates a current motion associated with the initiator node. Initiator node pitch, roll and yaw field 730 may include data identifying pitch, roll and/or yaw motions of a vehicle body associated with the initiator optical node. The pitch, roll and yaw data field 730 may be encoded in any number of conventional ways.

Exemplary Target Node Location Message

FIG. 8 illustrates an exemplary target node location message 800 that may be sent from a responder optical node back to an initiator optical node, in response to a request link message 700 from the initiator optical node, informing the initiator node of the target node's current position. Target location message 800 may include a message type field 805, an initiator node ID field 710, a target node ID field 715, an optional message tag field 720, an optional target node location field 810 and an optional target node pitch, roll and yaw field 815.

Message type field 805 may designate message 800 as a target node location message. Target node location field 810 may include data identifying a geographic location of the target optical node. Such geographic location data may include, for example, a latitude, longitude and altitude associated with the location of the responder node. Node location field 810 may be derived from data from node location determining device(s) 520 of the target optical node 205. In some exemplary embodiments, node location data field 810 may additionally include a three-dimensional velocity vector and, possibly, a three-dimensional acceleration vector that indicates a current motion associated with the target node. Target node pitch, roll and yaw field 815 may include data identifying pitch, roll and/or yaw motions of a vehicle associated with the target optical node. The pitch, roll and yaw data field 815 may be encoded in any number of conventional ways. Fields 710-720 may include data similar to that discussed above with respect to message 700.

Exemplary Make Link Message

Figure 9:
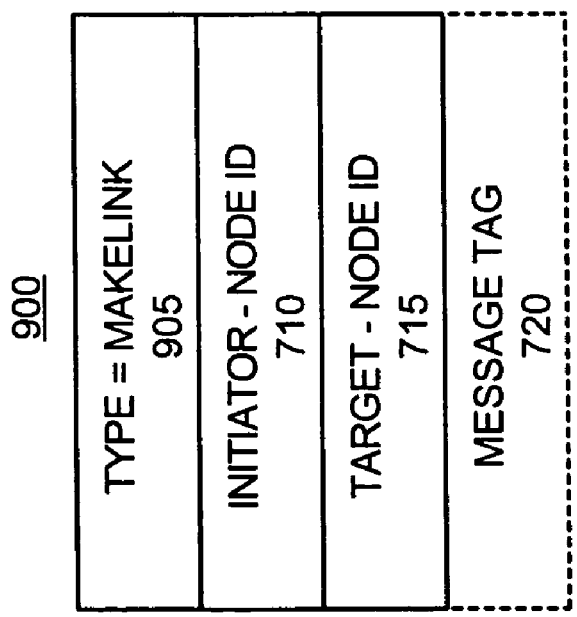
FIG. 9 illustrates an exemplary "make link" message, consistent with the present invention, used by a master node in some exemplary embodiments to approve the establishment of an optical link for communicating between an initiator optical node and a target optical node in an optical ad-hoc network.

FIG. 9 illustrates an exemplary make link message 900 that may be sent from a master node to an initiator node, and a target node, agreeing to the establishment of an optical link between the initiator node and the target node. Make link message 900 may include a message type field 905, an initiator node ID field 710, a target node ID field 715 and an optional message tag field 720. Message type field 905 may designate message 900 as a make link message. Fields 710-720 may include data similar to that discussed above with respect to message 700.

Exemplary Reject Message

Figure 10:
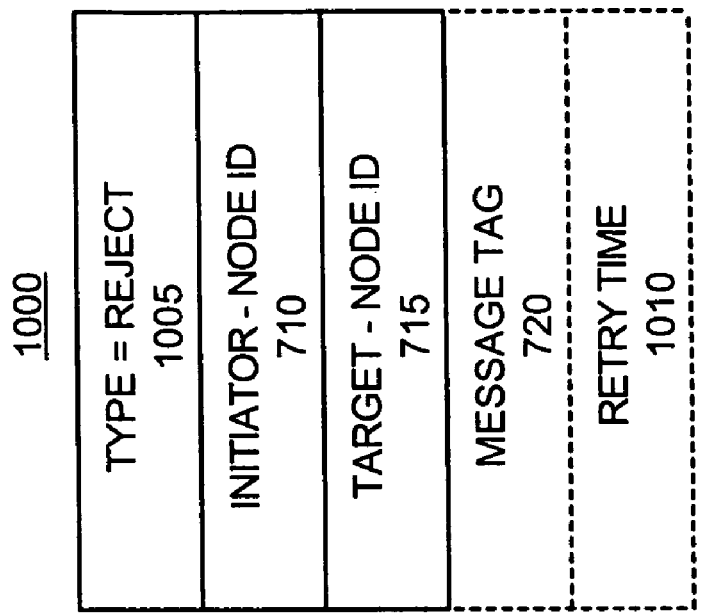
FIG. 10 illustrates an exemplary "reject" message, consistent with the present invention, used by a master node in some exemplary embodiments for rejecting the establishment of an optical link between an initiator optical node and a target optical node in an optical ad-hoc network.

FIG. 10 illustrates an exemplary reject message 1000 that may be sent from a master node back to an initiator node, in response to a request link message 700 from the initiator node, rejecting the establishment of an optical link between the initiator node and a target node. Reject message 1000 may include a message type field 1005, an initiator node ID field 710, a target node ID field 715, an optional message tag field 720 and an optional retry time field 1010. Message type field 1005 may designate message 1000 as a reject message. Retry time field 1010 may include scheduling information that identifies when the initiator optical node should attempt to send another request link message. The scheduling information may include, for example, a "wall clock time" (e.g., 09:35:17), or it may be a relative time, e.g., a number of milliseconds from a reference time when the request link retry should be made. Fields 710-720 may include data similar to that discussed above with respect to request link message 700.

Exemplary Optical Link Establishment and Tear Down Process

Figure 11:
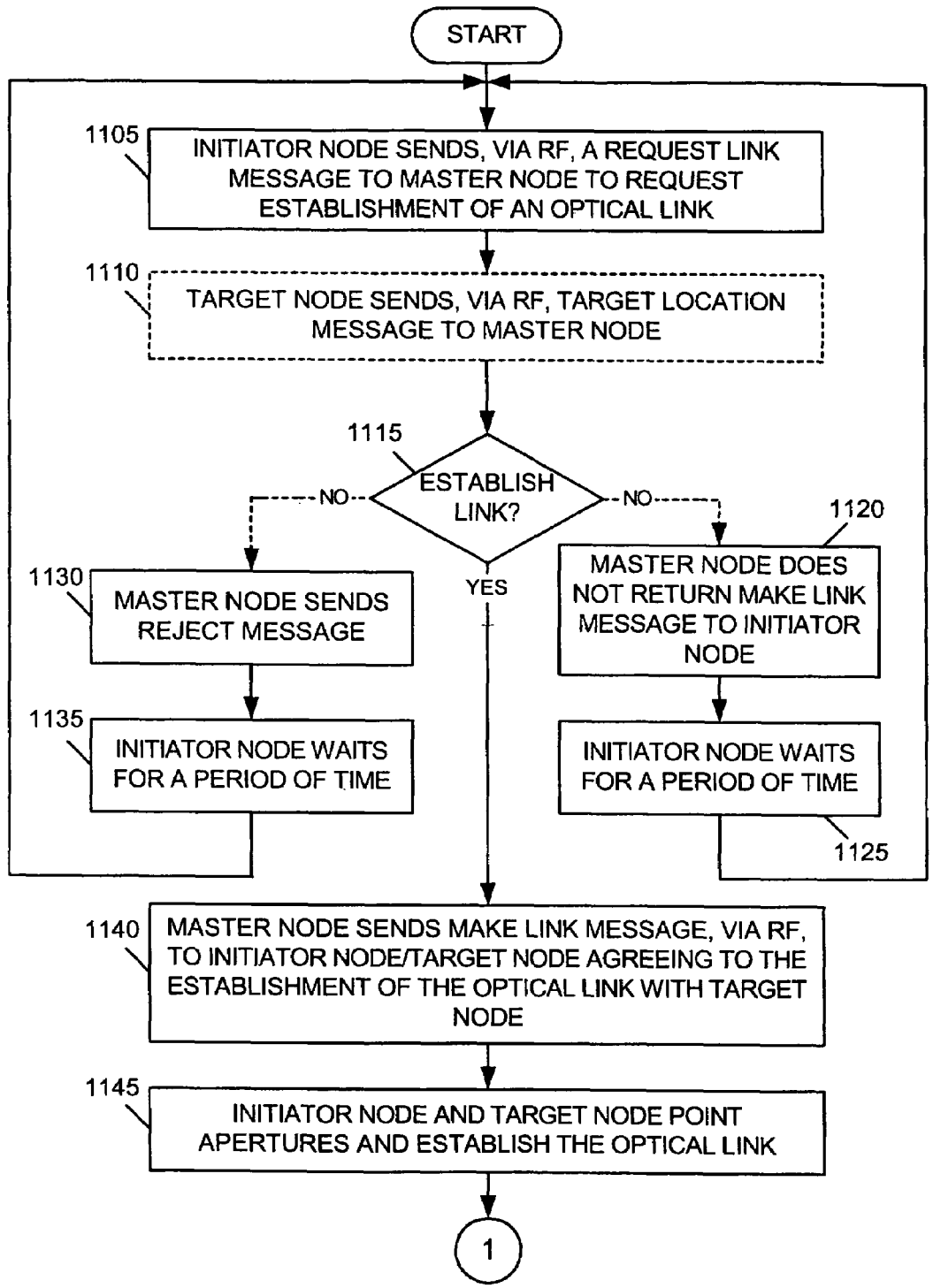
FIGS. 11-12 are flow charts that illustrate an exemplary optical link establishment and tear down process consistent with the present invention.
Figure 12:
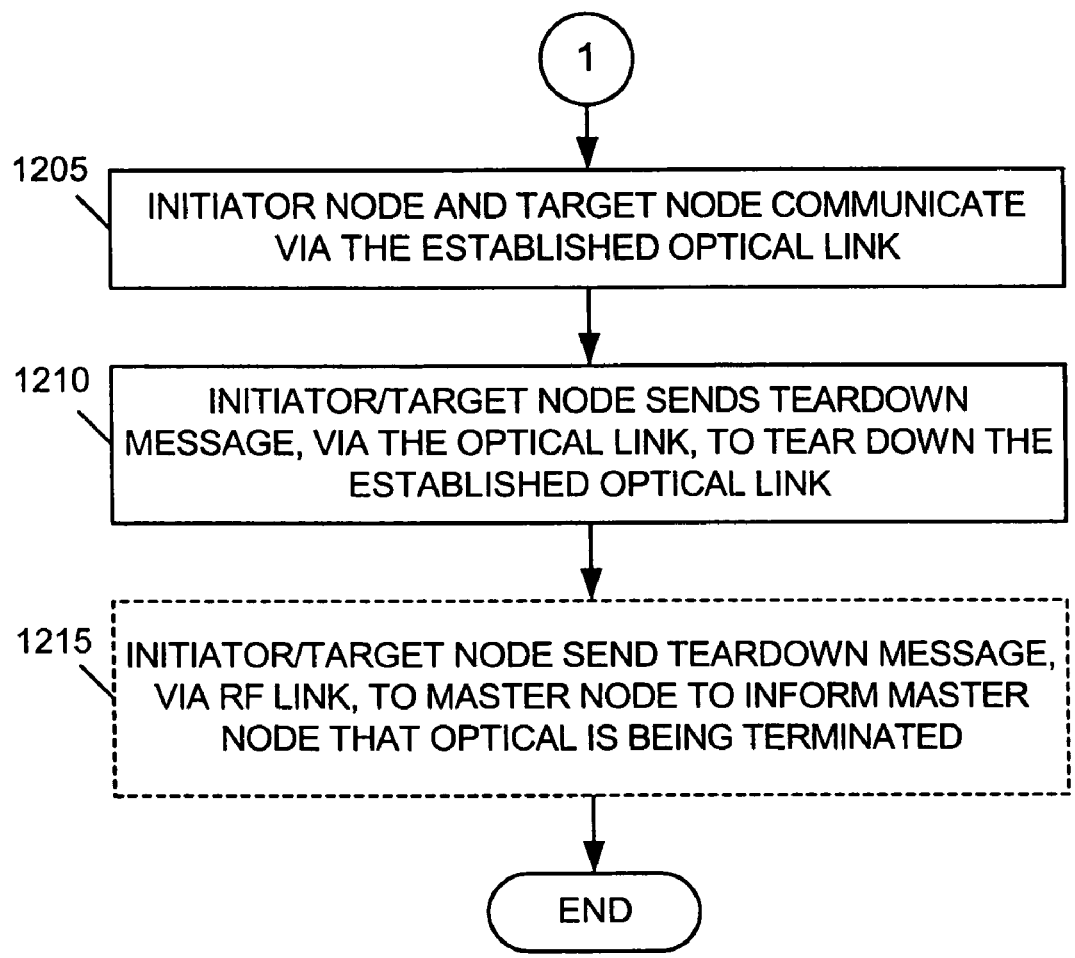
Figure 13:
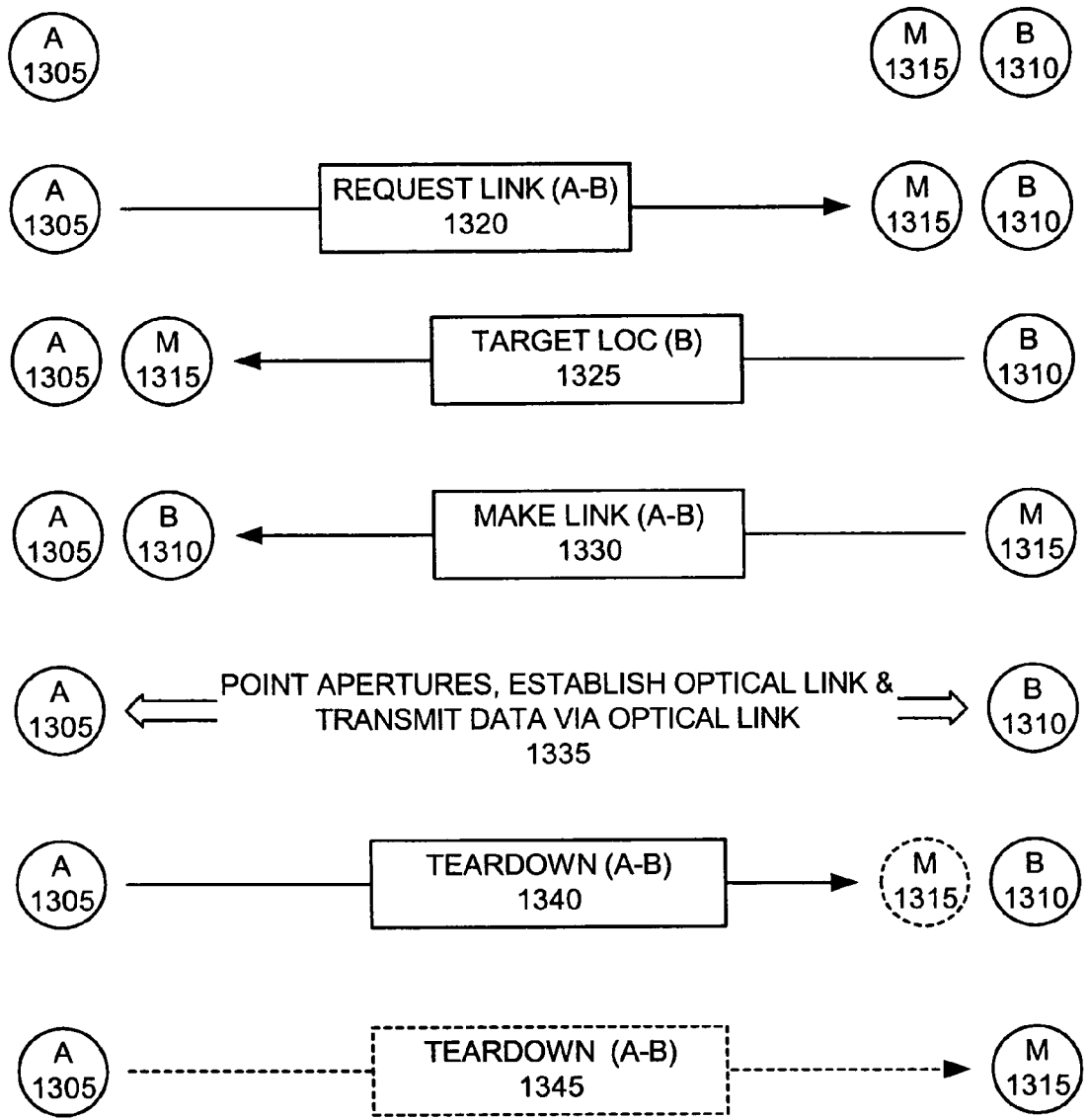
FIG. 13 is a diagram that graphically illustrates the exemplary optical link establishment and tear down process of FIGS. 11-12 consistent with the present invention.
Figure 14:
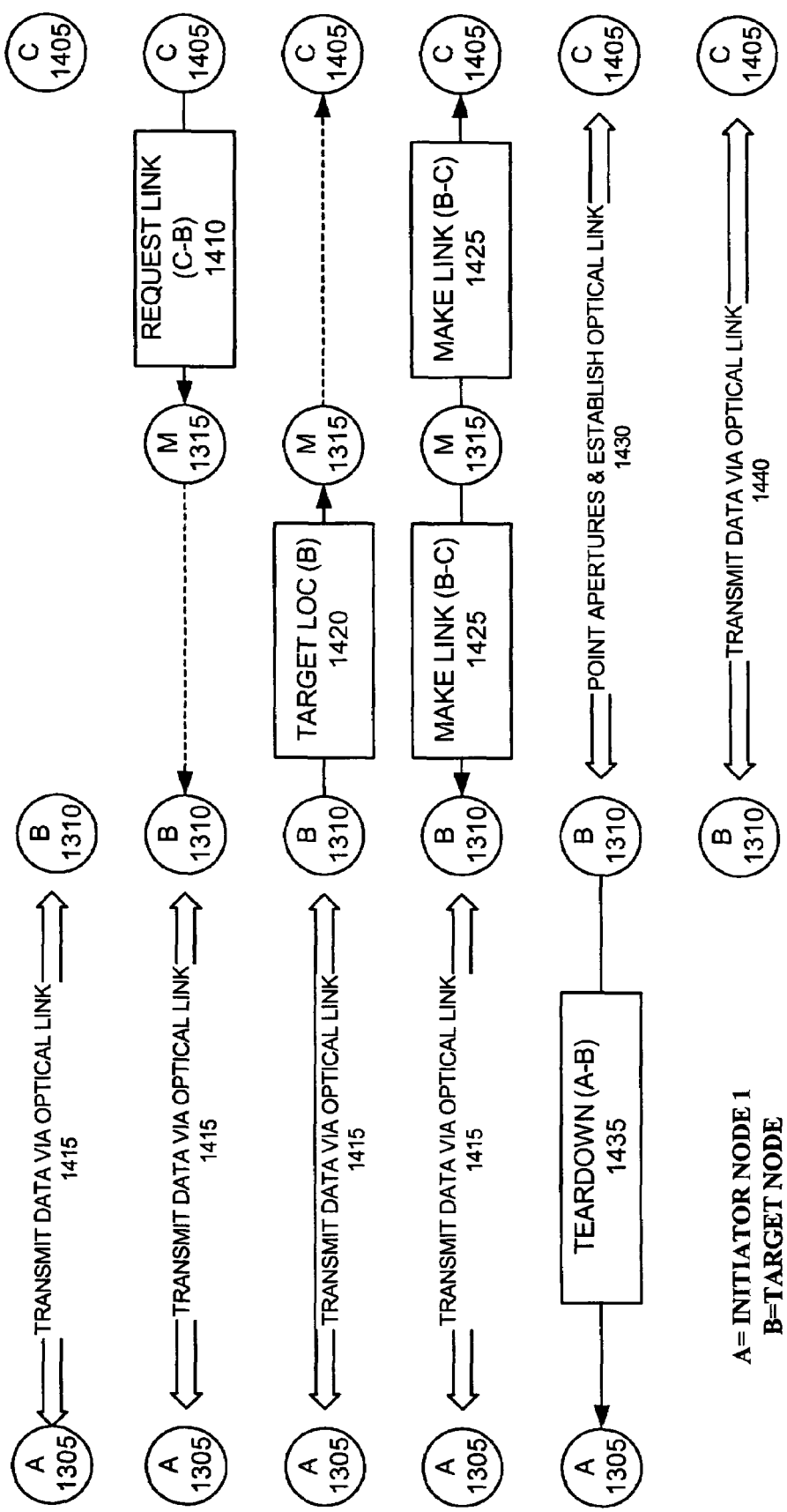
FIG. 14 is a diagram that graphically illustrates exemplary optical link establishment and tear down processes involving three optical nodes and a master node consistent with the present invention.

FIGS. 11-12 are flowcharts that illustrate an exemplary process, consistent with the present invention, for establishing and tearing down an optical link between an initiator optical node and a target optical node, via the supervision of a master node, in optical ad-hoc sub-network 105. FIGS. 13 and 14 may also be referred to below for the purposes of graphically illustrating the exemplary process of FIGS. 11-12.

The exemplary process may begin with an initiator optical node (e.g., node A 1305 in FIG. 13) sending, via, for example, a RF channel, a request link message 1320 (e.g., request link message 700 illustrated in FIG. 7) to a master optical node (e.g., master node M 1315 in FIG. 13) in ad-hoc sub-network 105 requesting the establishment of an optical link with a target optical node (e.g., target node B 1310 in FIG. 13) [act 1105]. The RF channel may include, for example, a time "slot" of TDMA ring 405. Initiator node A 1305 may learn of the presence of target node B 1310 through, for example, notification messages broadcast by target node B 1310 notifying neighboring nodes of target node B's 1310 unique identifier, and its location and, possibly, its velocity and/or acceleration. The request link message 1320 sent by initiator node A 1305 may include the node's unique identifier in the initiator node ID field 710, node A's 1305 location in the initiator node location field 725 and the node A's 1305 pitch, roll, and yaw motion in the initiator node pitch, roll, and yaw field 730. If request link message 1320 has been broadcast, and node B 1310 "heard" the request link message 1320 sent to master node 1315, then target node B 1310 may, optionally, send a target location message 1325 (e.g., target location message 800 in FIG. 8), via a RF channel, to master node 1315 [act 1110]. The RF channel may include, for example, a time "slot" of TDMA ring 405. If target location message 1325 has been sent on a broadcast RF channel, initiator node A 1305 may also receive and process the message to learn node B's 1310 current position.

Master node 1315 may receive the request link message 1320 and, possibly, the target location message 1325, and may determine whether initiator node A 1305 may be permitted to establish a link with target node B 1310 [act 1115]. Target node 1310 may be unable to establish a link with initiator node 1005 if, for example, all of target node's 1310 optical link subsystems 510 are already employed communicating via optical links/channels with other optical nodes 205. In one optional exemplary implementation, if master node M 1315 determines that target node B 1310 is unable to establish an optical link with initiator node A 1305, then master node M 1315 may choose not to return a make link message 1330 to initiator node A 1305 [act 1120]. Initiator node A 1305 may wait a configurable period of time after sending the request link message 1320 [act 1125] and may then return to act 1105 above to send another request link message 1320.

In another exemplary implementation, if target node B 1310 is unable to establish an optical link with initiator node A 1305, then master node M 1315 may send a reject message 1000 (not shown in FIG. 13) to initiator node A 1305 [act 1130] via, for example, a RF channel. The RF channel may include, for example, a time "slot" of TDMA ring 405. Reject message 1000 may specify the initiator node A's 1305 unique identifier in initiator node ID field 710 and target node B's 1310 unique identifier in target node ID field 715. Reject message 1000 may additionally include scheduling information in retry time field 1010 that specifies when initiator node A 1305 should retry sending another request link message 1320. Subsequent to receiving the reject message 1000 from master node M 1315, initiator node 1305 may wait a specified period of time [act 1135] before returning to act 1105 to send another request link message 1320. The specified period of time may be preset at initiator node 1305, or may be retrieved from the optional retry time 1010 included in reject message 1000.

Returning to act 1115, if master node M 1315 determines that initiator node A 1305 may be permitted to establish an optical link with target node B 1310, then master node M 1315 may broadcast a make link message 1330 (e.g., make link message 900 of FIG. 9), via a RF channel, to initiator node 1305 and target node B 1310 permitting the establishment of the optical link [act 1140]. The RF channel may include, for example, a time "slot" of TDMA ring 405. Make link message 1330 may include the initiator node A's 1305 unique identifier in the initiator node ID field 710 and the target node B's 1310 unique identifier in the target node ID field 715.

In accordance with the location, pitch, roll and yaw information retrieved from the request link message 1320 or target location message 1325 received at either the initiator node A 1305 or the target node B 1310, the optical acquisition, pointing and tracking systems 555 of both nodes point their apertures towards one another and establish an optical link [act 1145] (see 1335, FIG. 13). The location information retrieved from request link message 1320 or target location message 1325 may also include a three-dimensional velocity vector and a three-dimensional acceleration vector that may permit initiator node A 1305 and/or target node B 1310 to steer its aperture along a predicted node trajectory, thus, increasing the odds of actually acquiring and locking in on the other node's optical aperture.

Initiator node A 1305 and target node B 1310 may then communicate via the established optical link [act 1205, FIG. 12] (see 1335, FIG. 13). When either node wishes to terminate the optical link, the terminating node (e.g., initiator node A 1305 shown in FIG. 13) may send a teardown message 1340, via the optical link, to the other node to notify the other node to tear down the established optical link [act 1210]. Initiator node A 1305 and target node B 1310 may terminate the optical link responsive to teardown message 1340. Alternatively, an optical link may simply fail of its own accord (e.g., when a cloud comes between two nodes, when equipment fails, etc.). Initiator node A 1305 and target node B 1310 may then determine optical link failure by the loss of signals and may remove the link from service without any explicit control message. Optionally, the terminating node (e.g., initiator node A 1305 shown in FIG. 13) may send a teardown message 1345, via an RF channel, to master node M 1315, to notify the master node that the optical link has been terminated. The RF channel may include, for example, a time "slot" of TDMA ring 405.

In some implementations consistent with the invention, as shown in FIG. 14, target node B 1310 may begin establishing an optical link with another initiator node C 1405, as instructed by master node M 1315, before terminating the optical link with initiator node A 1305. Initiator node C 1405 may send a request link message 1410 to master node M 1315 while target node B 1310 is still communicating (see 1415, FIG. 14) with initiator node A 1305 via an optical link. Similar to the exemplary process illustrated in FIG. 13, target node B 1310 may respond with a target location message 1420 to initiator node C 1405 during the same time period that target node B 1310 is still communicating with initiator node A 1305 (see 1415, FIG. 14). Master node M 1315 may then broadcast a make link message 1425 to target node B 1310 and initiator node C 1405 granting the nodes permission to establish an optical link between one another. In response to the make link message 1425, the optical acquisition, pointing and tracking systems 555 of target node B 1310 and initiator node C 1405 may point their apertures towards one another to establish the granted optical link (see 1430, FIG. 14). Prior to establishment of the optical link with initiator node C 1405, target node B 1310 may send a teardown message 1435 to initiator node A 1305 terminating the optical link with node A 1305. Initiator node C 1405 and target node B 1310 may then transmit data between one another via the established optical link (see 1440, FIG. 14).

CONCLUSION

Systems and methods consistent with the present invention may use a hybrid RF/optical channel access scheme, where nodes use RF messaging to request access to the optical channels via a master node that coordinates and supervises the establishment of optical links in the network. In response to the RF messaging, the master node may grant permission to the ad-hoc nodes to establish optical links for high-speed communication via optical channels. Optical links, consistent with the invention, permit very high data throughputs, such as multiple gigabits per second, in an ad-hoc environment, where nodes may be moving around and links may be created and terminated with a high degree of frequency. In some exemplary embodiments, establishment of the optical links may include steering of one or more optical apertures, such as, for example, an optical telescope, to point towards the node to which an optical link is going to be established. Steering of the optical aperture may, thus, permit optical link establishment with mobile optical nodes that may frequently change position.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. Furthermore, though the present invention has been described in the context of an ad-hoc network, the present invention may be employed in any environment where optical nodes contend for access to a shared optical communications medium. For example, the present invention may be used in a network that employs only optical fiber, or a mix of optical fiber and free-space optical links. Additionally, other electrically transmissive mediums may be used as an alternative to, or in conjunction with the RF medium used for transmitting the RF messages of the present invention. Such other electrically transmissive mediums may include, for example (but are not limited to), a wired medium that may employ Ethernet, Internet, ATM or any other type of wired medium protocol.

While series of acts have been described with regard to FIGS. 11-12, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of implementing optical channel access in a network comprising a plurality of distributed nodes and a master node, the method comprising:

requesting the optical channel access via radio-frequency (RF) messaging from one or more of the plurality of distributed nodes to the master node;

granting, from the master node, the optical channel access to another one of the plurality of distributed nodes based on the RF messaging; and establishing an optical channel by steering a first optical aperture to point towards the other one of the plurality of distributed nodes from the one of the plurality of distributed nodes and establishing the optical channel via the first optical aperture.

2. The method of claim 1, where the optical channel comprises a free-space channel.

3. The method of claim 1, where the optical channel comprises an optical fiber channel.

4. The method of claim 1, where the plurality of distributed nodes comprise mobile nodes.

5. The method of claim 1, where the network comprises an ad-hoc network.

6. The method of claim 1, further comprising:

denying, from the master node, optical channel access to the other of the plurality of distributed nodes based on the RF messaging.

7. The method of claim 6, where denying optical channel access comprises:

sending an access denial message via RF messaging from the master node.

8. The method of claim 1, where granting optical channel access to the other one of the plurality of distributed nodes comprises:

sending an access granted message via RF messaging from the master node.

9. The method of claim 7, further comprising:

subsequent to optical channel access denial, waiting a period of time before repeating the optical channel access request via RF messaging.

10. The method of claim 9, where the period of time is derived from a retry time contained in the access denial message.

11. A system for implementing optical channel access in a network comprising a plurality of distributed nodes, comprising:
- a first node of the plurality of distributed nodes configured to request the optical channel access with at least one other node via radio-frequency (RF) messaging;
- a second node of the plurality of distributed nodes configured to grant or deny the requested optical channel access; and
- a third node configured to establish the optical channel access to the first node based on whether the second node grants or denies the requested optical channel access, where establishing an optical channel comprises steering a first optical aperture to point towards the second node from the first node, where the optical channel is established via the first optical aperture.

12. A method of establishing an optical link between a first node and a second node in a network, where at least one of the first and second nodes comprises a mobile node, the method comprising:
- sending a request message to establish the optical link from the first node to a third node via electrical signals over an electrically transmissive medium;
- receiving a request denied message or a request granted message from the third node via electrical signals over the electrically transmissive medium;
- establishing an optical link between the first node and the second node based on the receipt of the request granted message, where establishing the optical link includes steering at least one steerable aperture to point towards at least one of the first or second nodes where the optical link is established via the steerable aperture; and
- transmitting data between the first node and the second node via optical signals over the optical link.

13. The method of claim 12, where the sending a request message to establish the optical link comprises:
- employing one or more time slots of a time division multiple access (TDMA) ring for sending the request message over the electrically transmissive medium.

14. The method of claim 12, where the optical link comprises a free-space link.

15. The method of claim 12, where the optical link comprises an optical fiber.

16. The method of claim 12, where the request denied message includes a time period that the first node is to wait before sending another request message to the third node.

17. The method of claim 12, where the electrical signals comprise radio-frequency (RF) signals and where the electrically transmissive medium comprises free-space.

18. The method of claim 12, where the electrically transmissive medium comprises a wired medium.

19. The method of claim 12, where the steerable aperture comprises a telescope.

20. A first node in a network, comprising:
- a non-optical transceiver configured to:
  - send a request message to a master node via electrical signals over an electrically transmissive medium to request permission to establish an optical link from the first node to a second node, where the second node comprises a mobile node, and
  - receive a request granted message or a request denied message from the master node; and
- an optical subsystem configured to:
  - establish an optical link between the first node and the second node based on the receipt of the request granted message, where establishing the optical link includes steering a first optical aperture to point towards the second node from the first node and establishing the optical link via the first optical aperture, and
  - transmit data between the first node and the second node via optical signals over the optical link.

21. The node of claim 20, where the non-optical transceiver is configured to:
- employ one or more time slots of a time division multiple access (TDMA) ring for sending the request message to the master node over the electrically transmissive medium.

22. The node of claim 20, where the optical link comprises a free-space link.

23. The node of claim 20, where the optical link comprises an optical fiber.

24. The node of claim 20, where the request denied message includes a time period that the first node is to wait before sending another request message to the master node.

25. The node of claim 20, where the electrical signals comprise radio-frequency (RF) signals and where the electrically transmissive medium comprises free-space.

26. The node of claim 20, where the electrically transmissive medium comprises a wired medium.

27. The node of claim 20, where the first optical aperture comprises a telescope.

28. A method of coordinating communication between first and second nodes in a network via a master node, comprising:
- arbitrating, at the master node, establishment of an optical channel between the first and second nodes by transmitting electrical signals over a non-optical channel to the master node from at least one of the first node or second node;
- granting, at the master node, the establishment of the optical channel between the first and second nodes based on the transmitted electrical signals over the non-optical channel;
- establishing the optical channel by steering a first optical aperture to point towards the second node from the first node and establishing the optical channel via the first optical aperture; and
- communicating via the established optical channel between the first and second nodes.

29. The method of claim 28, where the first node comprises a mobile node.

30. The method of claim 28, where establishing the optical channel further comprises:
- steering a second optical aperture to point towards the first node from the second node; and
- establishing the optical channel via the second optical aperture.

31. The method of claim 30, where the first and second optical apertures comprise telescopes.

32. The method of claim 28, where the non-optical channel comprises a radio-frequency (RF) channel.

33. The method of claim 28, where the non-optical channel comprises a wired medium.

34. The method of claim 33, where the wired medium employs at least one of Ethernet, Internet, or ATM protocols.

35. The method of claim 28, where the optical channel comprises free space.

36. The method of claim 28, where the optical channel comprises an optical fiber.

37. A system for establishing an optical link with a mobile node in a network, comprising:
- means for sending a request message to establish the optical link from a first node to a third node via electrical signals over an electrically transmissive medium;
- means for receiving at least one of a request denied message or a request granted message from the third node via electrical signals over the electrically transmissive medium;
- means for establishing an optical link between the first node and the mobile node based on the receipt of the request granted message, where establishing the optical link includes steering a first optical aperture to point towards the second node from the first node and establishing the optical link via the first optical aperture; and
- means for transmitting data between the first node and the mobile node via optical signals over the optical link.

* * * * *